United States Patent
Hwang et al.

(10) Patent No.: US 11,223,072 B2
(45) Date of Patent: Jan. 11, 2022

(54) APPARATUS FOR ASSIGNING IDENTIFICATION INFORMATION TO SLAVE BATTERY MANAGEMENT UNITS

(71) Applicant: LG CHEM, LTD., Seoul (KR)

(72) Inventors: Ji-Won Hwang, Daejeon (KR); Yean-Sik Choi, Daejeon (KR); Ji-Eun Kim, Daejeon (KR); Chang-Hyun Sung, Daejeon (KR); Sang-Hoon Lee, Daejeon (KR)

(73) Assignee: LG Chem, Ltd., Seoul (KR)

(*) Notice: Subject to any disclaimer, the term of this patent is extended or adjusted under 35 U.S.C. 154(b) by 134 days.

(21) Appl. No.: 16/481,641

(22) PCT Filed: Sep. 5, 2018

(86) PCT No.: PCT/KR2018/010378
§ 371 (c)(1),
(2) Date: Jul. 29, 2019

(87) PCT Pub. No.: WO2019/059568
PCT Pub. Date: Mar. 28, 2019

(65) Prior Publication Data
US 2020/0006815 A1 Jan. 2, 2020

(51) Int. Cl.
*H01M 10/42* (2006.01)
*H01M 10/48* (2006.01)
(Continued)

(52) U.S. Cl.
CPC ..... *H01M 10/4257* (2013.01); *H01M 10/482* (2013.01); *H01M 50/20* (2021.01);
(Continued)

(58) Field of Classification Search
CPC ........... H01M 10/425; H01M 10/4257; H01M 10/482; H01M 2010/4271; H01M 50/20; H01Q 17/00; H01Q 1/22; Y02E 60/10
See application file for complete search history.

(56) References Cited

U.S. PATENT DOCUMENTS

2011/0175574 A1   7/2011   Sim et al.
2012/0112685 A1   5/2012   Hartley et al.
(Continued)

FOREIGN PATENT DOCUMENTS

CN   102640383 A1   8/2012
EP   3 208 625 A1   8/2017
(Continued)

OTHER PUBLICATIONS

Machine Translation WO2016128160A1 (Year: 2016).*
(Continued)

*Primary Examiner* — Victoria H Lynch
(74) *Attorney, Agent, or Firm* — Morgan, Lewis & Bockius LLP

(57) ABSTRACT

Provided is an apparatus for assigning identification information to a plurality of slave battery management units. The apparatus assigns different identification information to a plurality of slave battery management units. The apparatus includes: a casing jig configured to at least partially cover the plurality of slave battery management units; a wireless communication unit including a plurality of antennas disposed so as to correspond one-to-one to the plurality of slave battery management units; and a controller configured to control the wireless communication unit so as to transmit a wireless signal including different identification information to the plurality of slave battery management units.

6 Claims, 4 Drawing Sheets

(51) Int. Cl.
    *H01Q 1/22*     (2006.01)
    *H01Q 17/00*    (2006.01)
    *H01M 50/20*    (2021.01)

(52) U.S. Cl.
    CPC ............... *H01Q 1/22* (2013.01); *H01Q 17/00* (2013.01); *H01M 2010/4271* (2013.01)

(56) References Cited

U.S. PATENT DOCUMENTS

| | | |
|---|---|---|
| 2013/0149578 A1 | 6/2013 | Uchida |
| 2013/0271072 A1 | 10/2013 | Lee et al. |
| 2014/0035365 A1 | 2/2014 | Yoo |
| 2014/0354291 A1 | 12/2014 | Kikuchi et al. |
| 2016/0056536 A1 | 2/2016 | Park et al. |
| 2016/0247389 A1 | 8/2016 | Shimizu et al. |
| 2016/0327612 A1 | 11/2016 | Terada et al. |

FOREIGN PATENT DOCUMENTS

| | | |
|---|---|---|
| JP | 2001-118037 A | 4/2001 |
| JP | 2012-085491 A | 4/2012 |
| JP | 2013-137867 A | 7/2013 |
| JP | 5710013 B2 | 3/2015 |
| KR | 10-2010-0137166 A | 12/2010 |
| KR | 10-2011-0013747 A | 2/2011 |
| KR | 10-2012-0030337 A | 3/2012 |
| KR | 10-2014-0015273 A | 2/2014 |
| KR | 10-2014-0103063 A | 8/2014 |
| KR | 10-2015-0006196 A | 1/2015 |
| KR | 10-2016-0074214 A | 6/2016 |
| KR | 10-1631064 B1 | 6/2016 |
| WO | 2014/103003 A1 | 7/2014 |
| WO | 2016/128160 A1 | 8/2016 |
| WO | 2017/002174 A1 | 1/2017 |

OTHER PUBLICATIONS

International Search Report dated Dec. 19, 2018, issued in corresponding International Application No. PCT/KR2018/010378.
Office Action dated Jul. 16, 2020, issued in corresponding Korean Patent Application No. 10-2017-0123421.
Extended European Search Report dated May 19, 2020, issued in corresponding International Application No. PCT/KR2018/010378.
Office Action dated Sep. 8, 2020, issued in corresponding Japanese Patent Application No. 2019-540584.
Office Action dated Nov. 12, 2021 in Chinese Patent Application No. 201880009762.4.

* cited by examiner

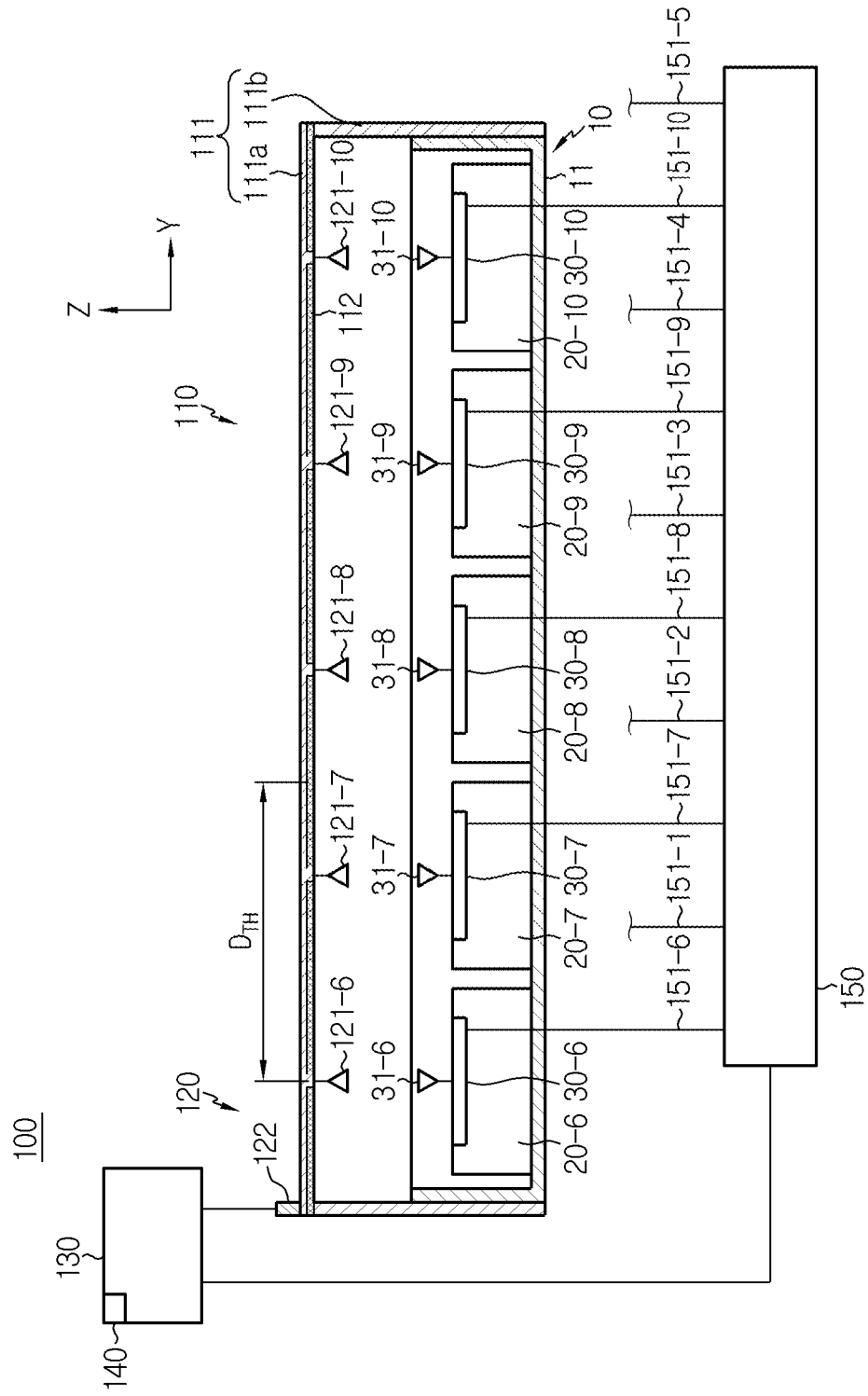

APPARATUS FOR ASSIGNING
IDENTIFICATION INFORMATION TO
SLAVE BATTERY MANAGEMENT UNITS

TECHNICAL FIELD

The present disclosure relates to an apparatus for assigning identification information to a plurality of slave battery management units mounted on a battery pack, and more particularly, to an apparatus for assigning different identification information to different slave battery management units by using a wireless signal before the assembly of a battery pack is completed.

The present application claims priority to Korean Patent Application No. 10-2017-0123421 filed on Sep. 25, 2017 in the Republic of Korea, the disclosures of which are incorporated herein by reference.

BACKGROUND ART

Recently, as the demand for portable electronic products such as notebook computers, video cameras, and mobile phones is rapidly increasing and the development of electric vehicles, energy storage batteries, robots, satellites, and the like is being regularized, studies on high performance secondary batteries capable of repeated charge and discharge have been actively conducted.

Currently available secondary batteries include nickel-cadmium batteries, nickel-hydrogen batteries, nickel-zinc batteries, and lithium secondary batteries. Of these, lithium secondary batteries have almost no memory effect as compared with nickel-based secondary batteries, and are thus free for charge and discharge and have a very low self-discharge rate and a high energy density. Due to these advantages, lithium secondary batteries have attracted attention.

A battery pack applied to an electric vehicle or the like typically includes a plurality of battery modules and a plurality of slave battery management units connected in series and/or in parallel. Each of the slave battery management units monitors and controls the state of the battery module to be managed. Recently, as large-capacity and high-output battery packs are required, the number of battery modules included in the battery pack is also increasing. In order to efficiently manage each battery module included in the battery pack, a multi-slave structure is disclosed. The multi-slave structure includes a plurality of slave battery management units installed in each battery module and a master battery management unit that controls the plurality of slave battery management units as a whole.

In a battery pack having a multi-slave structure, in order for a master battery management unit to collect state information of a plurality of battery modules from a plurality of slave battery management units and transmit a control command for the plurality of battery modules to the plurality of slave battery management units, each slave battery management unit must be assigned an ID indicating a physical or electrical position of a battery module to be managed.

Patent Literature 1 discloses a technique for sequentially assigning IDs to a plurality of slave battery management units. Patent Literature 1 proposes a method of assigning an ID in a state in which a master battery management unit is connected to each slave battery management unit by wire. However, in the ID assigning method according to Patent Literature 1, since it is assumed that the master battery management unit is connected to each slave battery management unit by wire, there are concerns such as disconnection of electric wires and space restriction is great. In addition, in order to set the IDs in the order of hardware positions of the respective slave battery management units, a process of measuring a potential difference by the batteries managed by each slave battery management unit must be preceded.

In addition, a method by which the master battery management unit assigns identification information to a plurality of slave battery management units in a wireless scheme may be considered. In order to assign identification information in a wireless scheme, the master battery management unit must precede a process of checking to which one of the plurality of battery modules included in the battery pack each slave battery management unit is electrically connected. However, even if each slave battery management unit wirelessly transmits, to the master battery management unit, module information (for example, potential, voltage, temperature, or the like) of the battery module to which the slave battery management unit is connected, it is difficult for the master battery management unit to determine by which of the plurality of slave battery management units each module information is transmitted.

(Patent Literature 1) Korean Patent Application Publication No. 10-2011-0013747 (published on Feb. 10, 2011)

DISCLOSURE

Technical Problem

The present disclosure is designed to solve the problems of the related art, and therefore the present disclosure is directed to providing an apparatus for assigning identification information to a plurality of slave battery management units (BMUs) mounted on a battery pack by using a wireless signal before the manufacturing of the battery pack is completed.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

Various embodiments of the present disclosure for achieving the above objects are as follows.

In one aspect of the present disclosure, there is provided an apparatus for assigning identification information to a plurality of slave battery management units electrically connected one-to-one to a plurality of battery modules mounted on a base plate of a battery pack.

The apparatus may include: a casing jig configured to at least partially cover the plurality of slave battery management units together with the base plate; a wireless communication unit including a plurality of antennas disposed in a region of the casing jig facing the base plate so as to correspond one-to-one to the plurality of slave battery management units; and a controller electrically connected to the wireless communication unit. The controller may be configured to select at least one of the plurality of antennas and transmit, to the wireless communication unit, a first control signal including identification information related to the at least one selected antenna. The wireless communication unit may be configured to output a wireless signal indicating the identification information through an antenna associated with the identification information in response to the first control signal.

According to an embodiment, the controller may be further configured to select two or more of the plurality of antennas at the same time, or to select the plurality of antennas one by one in a predetermined order.

According to an embodiment, the wireless signal may have signal strength in a predetermined range.

According to an embodiment, the casing jig may include: a supporting member at least partially made of a metallic material and defining an overall appearance of the casing jig so that the plurality of antennas are disposed; and an electromagnetic wave absorbing member coupled to at least a part of an inner surface of the supporting member.

According to an embodiment, the controller may include a memory in which a plurality of reference positions and a plurality of pieces of identification information mapped one-to-one to the plurality of reference positions are stored. The plurality of reference positions may indicate positions at which the plurality of antennas are disposed in the casing jig, respectively.

According to an embodiment, the controller may be further configured to: select a first antenna and a second antenna among the plurality of antennas at the same time with reference to the plurality of reference positions pre-stored in the memory. A distance between a first reference position corresponding to the first antenna and a second reference position corresponding to the second antenna is equal to or greater than a predetermined threshold distance.

According to an embodiment, the apparatus may further include a power supply unit configured to selectively supply operating power to at least one of the plurality of slave battery management units. When transmitting the first control signal, the controller may be further configured to transmit, to the power supply unit, a second control signal related to the first control signal. The power supply unit may be further configured to supply the operating power to the slave battery management unit corresponding to the at least one selected antenna among the plurality of slave battery management units, in response to the second control signal.

Advantageous Effects

According to at least one of the embodiments of the present disclosure, identification information may be assigned to each of the plurality of slave BMUs mounted on a battery pack by using a wireless signal. Therefore, identification information for each of the plurality of slave BMUs may be easily assigned without separate wired connection lines.

In addition, according to at least one of the embodiments of the present disclosure, identification information may be assigned to each of the plurality of slave BMUs before the manufacturing of the battery pack is completed.

The effects of the present disclosure are not limited to the above-described effects, and other effects not described herein may be clearly understood by those skilled in the art from the description of the claims.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 4 is a diagram referred to in describing an identification information assigning apparatus according to an embodiment of the present disclosure.

MODE FOR DISCLOSURE

Figure 1:
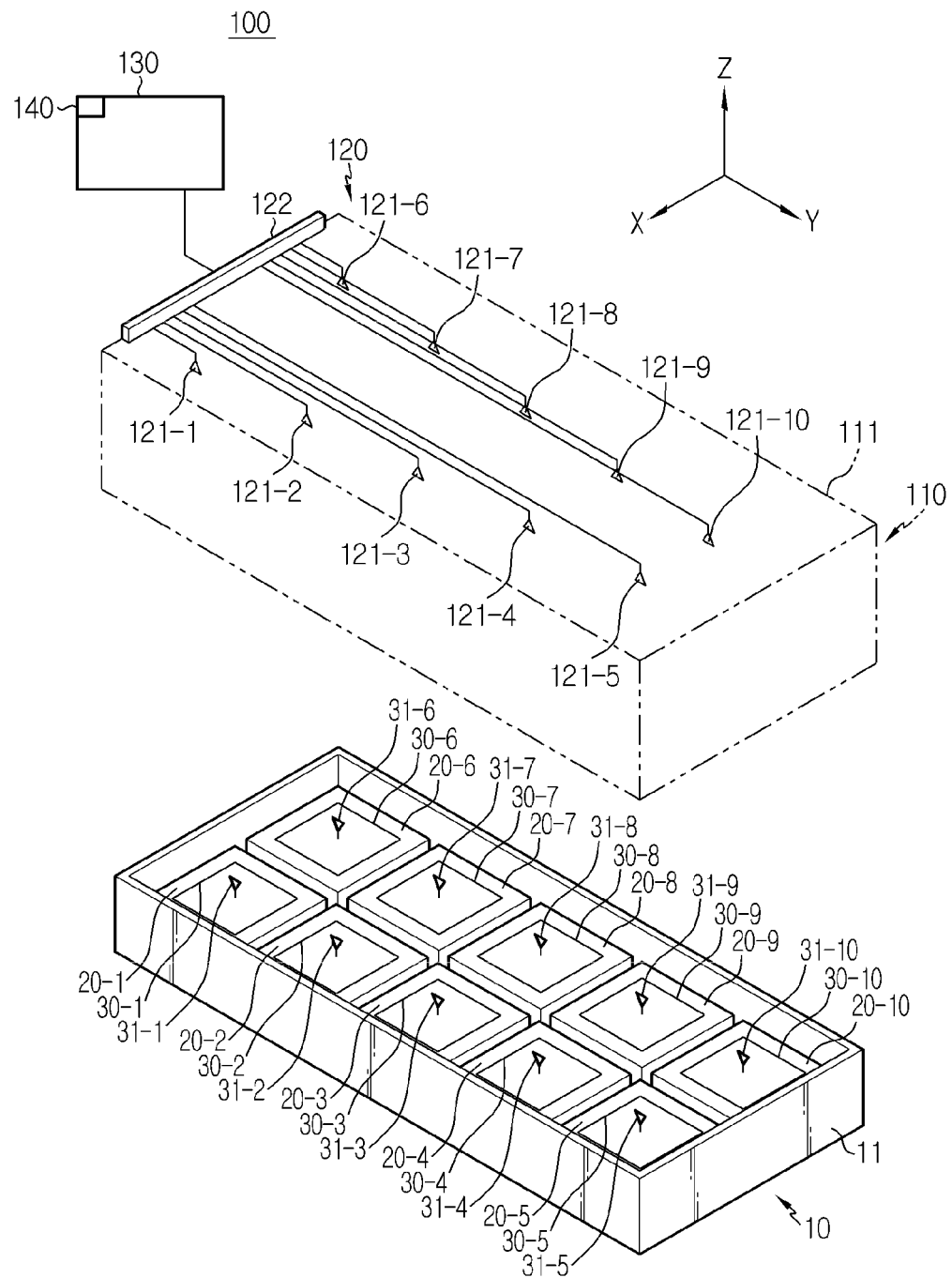
FIG. 1 is a diagram schematically illustrating a state in which an identification information assigning apparatus according to an embodiment of the present disclosure is separated from a base plate of a battery pack.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, it should be understood that various equivalents and alternatives can be made at the time of filing the present disclosure since the descriptions of the specification and the features shown in the drawings are no other than preferred embodiments without reflecting all the technical ideas of the present disclosure.

However, in the following descriptions and the accompanying drawings, descriptions of well-known functions or constructions will be omitted if they are considered to unnecessarily obscure the gist of the present disclosure.

It should be understood that terms including ordinals, such as first, second, etc., are used for the purpose of distinguishing one of various components from the others, and are not used to limit the components by such terms.

It should be understood that terms such as "comprise", "include", and "have", when used herein, specify the presence of stated elements, but do not preclude the presence or addition of one or more other elements. In addition, the terms "control unit" as used herein represent a unit for processing at least one function or operation, which may be implemented by hardware, software, or a combination thereof.

It should be understood that when a region is referred to as being "connected to" or "coupled to" another region, it may be "directly" connected or coupled to the other region, or may be "indirectly" connected or coupled to the other region, with intervening regions being disposed therebetween.

Figure 2:
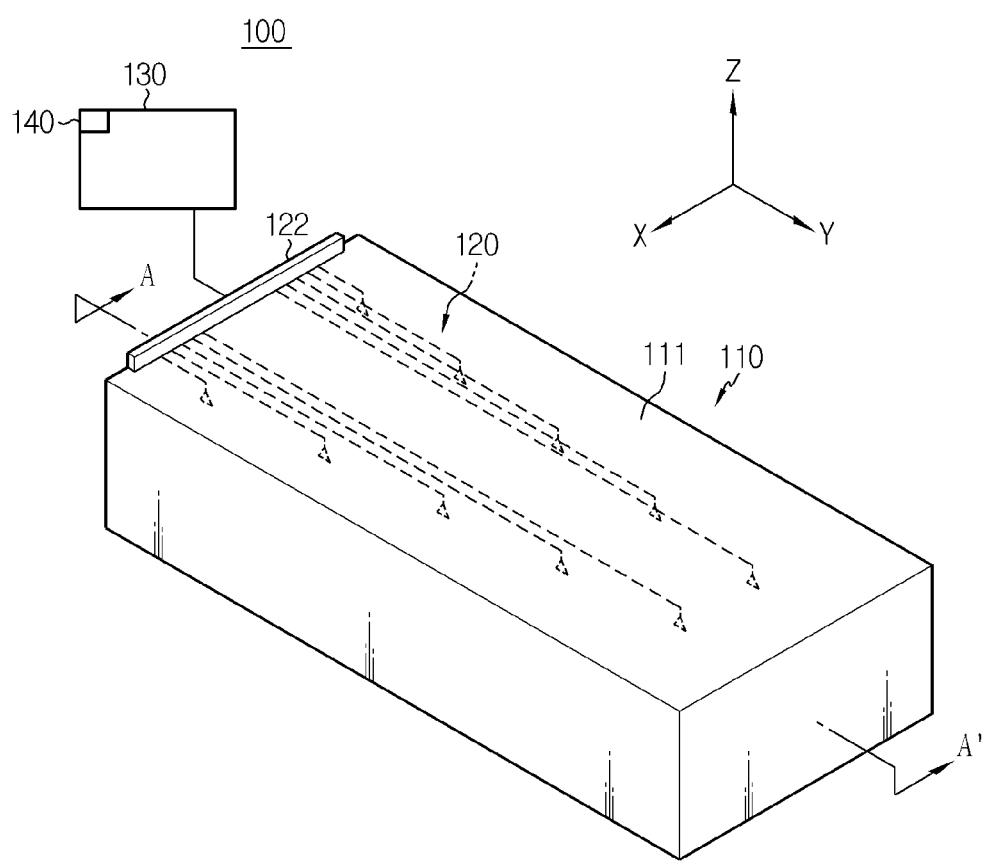
FIG. 2 is a diagram schematically illustrating a state in which the identification information assigning apparatus of FIG. 1 is coupled to the base plate of the battery pack.
Figure 3:
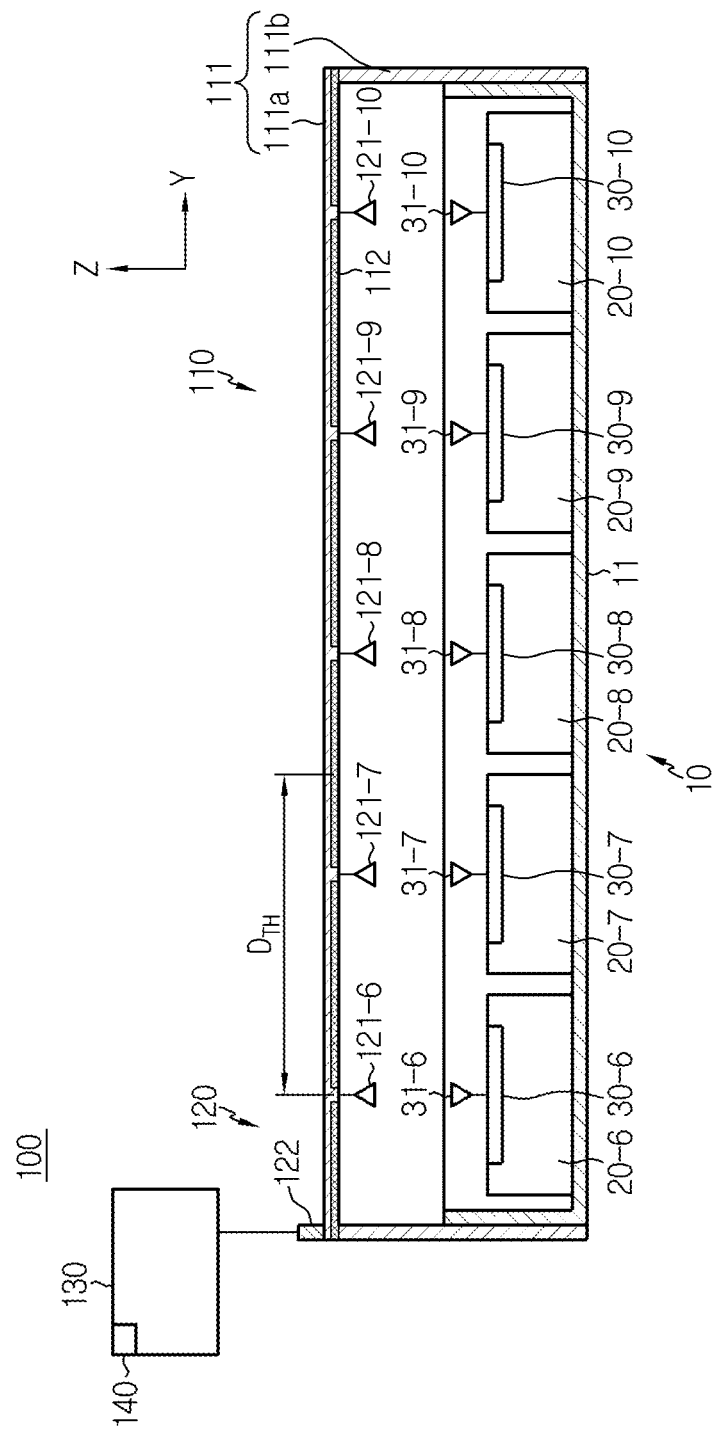
FIG. 3 is a cross-sectional view taken along line A-A of FIG. 2.

FIG. 1 is a diagram schematically illustrating a state in which an identification information assigning apparatus 100 according to an embodiment of the present disclosure is separated from a base plate 11 of a battery pack 10, FIG. 2 is a diagram schematically illustrating a state in which the identification information assigning apparatus 100 of FIG. 1 is coupled to the base plate 11 of the battery pack 10, and FIG. 3 is a cross-sectional view taken along line A-A' of FIG. 2.

Referring to FIGS. 1 to 3, the identification information assigning apparatus 100 (hereinafter, referred to as an "apparatus") assigns different identification information to a plurality of slave BMUs 30 mounted on the battery pack 10 before assembly is completed. The identification information may be, for example, a unique address used for wireless communication with a master BMU (not illustrated). The battery pack 10 is assembled by mounting a plurality of battery modules 20, the plurality of slave BMUs 30, and the master BMU on the base plate 11 and coupling a pack cover (not illustrated). The apparatus 100 is used to assign identification information to each of the plurality of slave BMUs 30 before the pack cover is coupled to the base plate 11.

For the sake of understanding, it is assumed that a total of ten battery modules 20-1 to 20-10 are arranged on the base plate 11 in a 2×5 matrix form. The plurality of slave BMUs 30-1 to 30-10 are electrically coupled one-to-one to the plurality of battery modules 20-1 to 20-10. Each of the slave BMUs 30 may be operated with operating power received from the battery module 20 or the apparatus 100 to which each of the slave BMU 30 is electrically connected. Each of the slave BMUs 30-1 to 30-10 includes at least one antenna 31 configured to collect wireless signals from the apparatus 100.

The apparatus 100 may include a casing jig 110, a wireless communication unit 120, a controller 130, and a memory 140.

The casing jig 110 is configured to at least partially cover the plurality of slave BMUs 30-1 to 30-10 together with the base plate 11. The casing jig 110 may have the equal or similar appearance to the pack cover (not illustrated) can be coupled to the base plate 11. It will be apparent that the shape and size of the casing jig 110 may be freely changed as needed.

The casing jig 110 basically includes a supporting member 111 and optionally further includes an electromagnetic wave absorbing member 112. The supporting member 111 defines the overall appearance of the casing jig 110 so that a plurality of antennas 121-1 to 121-10 included in the wireless communication unit 120 may be disposed. According to an embodiment, at least a portion of the supporting member 111 may be made of a metallic material.

For example, the supporting member 111 may have a substrate 111a forming the upper surface of the casing jig 110 and a partition wall 111b forming the side surface, and the lower portion thereof may be opened so as to have a basket shape. The opened lower portion of the casing jig 110 is at least partly closed by the base plate 11. The plurality of battery modules 20-1 to 20-10, the plurality of slave battery management units 30-1 to 30-10, and the plurality of antennas 121-1 to 121-10 are accommodated in the inner space provided by the connection of the casing jig 110 and the base plate 11.

The electromagnetic wave absorbing member 112 is coupled to at least a part of the inner surface of the supporting member 111. The electromagnetic wave absorbing member 112 suppresses noise caused by electromagnetic waves generated from the plurality of antennas 121-1 to 121-10 in the internal space provided by the connection of the casing jig 110 and the base plate 11.

The wireless communication unit 120 includes the plurality of antennas 121-1 to 121-10 and a wireless communication circuit 122. The plurality of antennas 121-1 to 121-10 are spaced apart from each other so as to correspond one-to-one to the plurality of slave BMUs 30-1 to 30-10 in a region of the lower surfaces of both sides of the substrate opposite to the base plate 11. That is, when (2×5)≥m≥1, the m-th antenna 121-m is disposed at a specific position of the casing jig 110 closer to the m-th slave BMU 30-m than the remaining antennas 121. The m-th antenna 121-m may be disposed within a reference distance from the m-th slave BMU 30-m and farther than the reference distance from the remaining slave BMUs 30.

The wireless communication circuit 122 transmits a wireless signal to at least one of the plurality of slave BMUs 30-1 to 30-10 through at least one of the plurality of antennas 121-1 to 121-10 in response to a first control signal from the controller 130. In this case, the first control signal may include antenna selection information and identification information. The antenna selection information included in the first control signal is information for selecting the antenna 121-k (k=1 to 10) to be used for outputting a wireless signal among the plurality of antennas 121-1 to 121-10. The identification information included in the first control signal is information to be assigned to the slave BMU 30-k corresponding to the antenna 121-k selected by the antenna selection information. The identification information included in the first control signal is modulated by the wireless communication circuit 122 and wirelessly transmitted through the antenna 121-k indicated by the antenna selection information. The wireless signal transmitted through the antenna 121-k may be received by an antenna 31-k provided in the slave BMU 30-k disposed at the position corresponding to the antenna 121-k among the plurality of slave BMUs 30-1 to 30-10.

The wireless communication circuit 122 may perform a control so that the wireless signal output by each antenna 121 selected by the first control signal has signal strength in a predetermined range. The strength of the wireless signal gradually weakens while the wireless signal propagates. Therefore, when each antenna 121 outputs the wireless signal having the signal strength in the predetermined range, only one slave BMU 30 disposed within the reference distance from each antenna 121 may normally detect the wireless signal. For example, the signal strength of the wireless signal output from the m-th antenna 121-m (m=1 to 10) is equal to or larger than threshold signal strength up to the reference distance from the m-th antenna 121-m. However, when it exceeds the distance from the m-th antenna 121-m, the signal strength of the wireless signal is smaller than the threshold signal strength, and thus only the slave BMU 30-m may respond to the wireless signal output by the m-th antenna 121-m. The threshold signal strength may be the minimum value of the signal strength that may be detected by each slave BMU 30.

The controller 130 includes a memory 140 and a processor and is electrically connected to the wireless communication unit 120. A plurality of pieces of reference position information and a plurality of pieces of identification information may be stored in the memory 140. The plurality of reference positions may individually indicate positions at which the plurality of antennas 121-1 to 121-10 are disposed in the casing jig 110.

The controller 130 may select at least one of the plurality of antennas 121-1 to 121-10 at a specific time point. That is, the controller 130 may simultaneously select two or more of the plurality of antennas 121-1 to 121-10, or may sequentially select the plurality of antennas 121-1 to 121-10 one by one in a predetermined order. The controller 130 transmits, to the wireless communication unit 120, the first control signal including the antenna selection information indicating the antenna 121-k selected by the controller 130 and the identification information related to the selected antenna 121-k.

When two or more of the plurality of antennas 121-1 to 121-10 are simultaneously selected, the controller 130 may refer to the plurality of reference positions prestored in the memory 140. Specifically, the controller 130 may determine two or more reference positions that are separated from each other by a threshold distance $D_{TH}$ or more among the plurality of reference positions. The threshold distance may be equal to or longer than the above-described reference distance. For example, since the distance between the sixth antenna 121-6 and the seventh antenna 121-7 is shorter than the threshold distance $D_{TH}$, when the controller 130 selects one of the sixth antenna 121-6 and the seventh antenna 121-7, the controller 130 does not select the other one at the same time. On the other hand, since the distance between the sixth antenna 121-6 and the eighth antenna 121-8 is longer than the threshold distance $D_{TH}$, the controller 130 may select the sixth antenna 121-6 and the eighth antenna 121-8 at the same time. Since the threshold distance $D_{TH}$ is the reference distance or more, even if two or more antennas (for example, 121-6 and 121-8) farther than the threshold distance $D_{TH}$ output two wireless signals at the same time, each of the slave BMUs (for example, 30-6 and 30-8) may normally receive only a wireless signal from one antenna corresponding to each of the slave BMUs 30.

In order to execute various control logics, the processor included in the controller 130 may optionally include a processor, an application-specific integrated circuit (ASIC), another chipset, a logic circuit, a register, a communication modem, a data processing device, and the like, which are known to those skilled in the art. At least one of the various control logics may be combined, and the combined control logics may be written in a computer-readable code system and recorded in a computer-readable recording medium. The recording medium is not particularly limited as long as the recording medium can be accessed by a processor included in a computer. For example, the recording medium includes at least one selected from the group consisting of a ROM, a RAM, a register, a CD-ROM, a magnetic tape, a hard disk, a floppy disk, and an optical data recording device. In addition, the code system may be modulated into a carrier signal and included in a communication carrier at a particular time point, and may be stored and executed in a networked computer in a distributed fashion. In addition, functional programs, codes, and code segments for implementing the combined control logics may be easily construed by programmers skilled in the art to which the present disclosure pertains.

FIG. 4 is a diagram referred to in describing an identification information assigning apparatus 100 according to an embodiment of the present disclosure. For the sake of understanding, the same cross-sectional view as that in FIG. 3 is illustrated.

Referring to FIG. 4, the apparatus 100 is the same as those of the embodiments described above with reference to FIGS. 1 to 3, except that the apparatus 100 further includes a power supply unit 150.

The power supply unit 150 is operatively coupled to the controller 130 and is connected to the plurality of slave BMUs 30-1 to 30-10 through a plurality of power supply lines 151-1 to 151-10. The power supply unit 150 is configured to selectively supply operating power to at least one of the plurality of slave BMUs 30-1 to 30-10. To this end, the power supply unit 150 is individually connected to the plurality of slave BMUs 30-1 to 30-10 through the plurality of power supply lines 151-1 to 151-10.

When the first control signal is transmitted to the wireless communication unit 120, the controller 130 may transmit, to the power supply unit 150, a second control signal related to the first control signal. The second control signal includes slave selection information corresponding to the antenna selection information included in the first control signal. For example, when the antenna selection information of the first control signal is information for selecting the m-th antenna 121-$m$, the slave selection information of the second control signal may be information for selecting the m-th slave BMU 30-$m$.

The power supply unit 150 may supply operating power to the slave BMU 30-$k$ corresponding to the antenna 121-$k$ selected by the first control signal among the plurality of slave BMUs 30-1 to 30-10 through the power supply line 151-$k$ in response to the second control signal. Since each slave BMU 30 selected by the second control signal activates its own antenna 31 by using the operating power from the power supply unit 150, the slave BMU 30 becomes a wake-up state in which the wireless signal from the wireless communication unit 120 can be detected. On the other hand, since the remaining slave BMUs 30 not selected by the second control signal are not supplied with the operating power from the power supply unit 150, the remaining slave BMUs 30 are remained in a sleep state in which the wireless signal from the wireless communication unit 120 can not be sensed.

While the present disclosure has been shown and described with reference to certain preferred embodiments thereof, but the present disclosure is not limited thereto. It should be understood by those skilled in the art that various changes and modifications can be made without departing from the spirit of the present disclosure as defined by the appended claims and their equivalents.

In addition, it should be understood by those skilled in the art that since various changes and modifications can be made without departing from the spirit of the present disclosure, the present disclosure is not limited to the above-described embodiments and the accompanying drawings, and all or some of the embodiments may be selectively combined so that various modifications can be made.

What is claimed is:

1. An apparatus for assigning identification information to a plurality of slave battery management units electrically each connected to a respective one of a plurality of battery modules mounted on a base plate of a battery pack, the apparatus comprising:
   a casing jig configured to at least partially cover the plurality of slave battery management units together with the base plate;
   a wireless communication unit including a plurality of antennas disposed in a region of the casing jig facing the base plate to each correspond to a respective one of the plurality of slave battery management units;
   a power supply unit configured to selectively supply operating power to at least one of the plurality of slave battery management units to selectively activate respective antennas of the plurality of slave battery management units, and
   a controller electrically connected to the wireless communication unit and the power supply unit,
   wherein the controller is configured to select at least one of the plurality of antennas included in the wireless communication unit and to transmit to the wireless communication unit a first control signal including identification information related to the at least one selected antenna,
   wherein, when transmitting the first control signal, the controller is further configured to transmit, to the power supply unit, a second control signal related to the first control signal, wherein the wireless communication unit is configured to output a wireless signal indicating the identification information through the at least one selected antenna associated with the identification information in response to the first control signal, and wherein the power supply unit is further configured to selectively supply the operating power to a respective one of the slave battery management unit corresponding to the at least one selected antenna among the plurality of slave battery management units, in response to the second control signal.

2. The apparatus of claim 1, wherein the controller is further configured to select two or more of the plurality of antennas at the same time, or to select the plurality of antennas one by one in a predetermined order.

3. The apparatus of claim 1, wherein the wireless signal has a signal strength in a predetermined range.

4. The apparatus of claim 1, wherein the casing jig comprises:

a supporting member at least partially made of a metallic material and defining an outer surface of the casing jig so that the plurality of antennas are disposed within the casing jig; and an electromagnetic wave absorbing member coupled to at least a part of an inner surface of the supporting member.

5. The apparatus of claim 1, wherein the controller comprises a memory in which a plurality of reference positions and a plurality of pieces of identification information mapped one-to-one to the plurality of reference positions are stored, and the plurality of reference positions indicate positions at which the plurality of antennas are disposed in the casing jig, respectively.

6. The apparatus of claim 5, wherein the controller is further configured to select a first antenna and a second antenna among the plurality of antennas at the same time with reference to the plurality of reference positions stored in the memory, and wherein a distance between a first reference position corresponding to the first antenna and a second reference position corresponding to the second antenna is equal to or greater than a predetermined threshold distance.

* * * * *